(12) United States Patent
Sunkara et al.

(10) Patent No.: US 8,307,345 B2
(45) Date of Patent: Nov. 6, 2012

(54) INTELLIGENT ENGINE FOR DYNAMIC AND RULE BASED INSTRUMENTATION OF SOFTWARE

(75) Inventors: Bhaskar Sunkara, San Francisco, CA (US); Jeffrey R. Cobb, Woodinville, WA (US)

(73) Assignee: CA, Inc., Islandia, NY (US)

( * ) Notice: Subject to any disclaimer, the term of this patent is extended or adjusted under 35 U.S.C. 154(b) by 1022 days.

(21) Appl. No.: 12/264,860

(22) Filed: Nov. 4, 2008

(65) Prior Publication Data
US 2010/0115495 A1 May 6, 2010

(51) Int. Cl.
G06F 9/44 (2006.01)
G06F 9/45 (2006.01)
(52) U.S. Cl. .................................. 717/130; 717/158
(58) Field of Classification Search .................. None
See application file for complete search history.

(56) References Cited

U.S. PATENT DOCUMENTS

| | | | |
|---|---|---|---|
| 5,790,858 A | 8/1998 | Vogel | |
| 6,026,237 A | 2/2000 | Berry | |
| 6,072,953 A | 6/2000 | Cohen | |
| 6,397,382 B1 | 5/2002 | Dawson | |
| 6,643,842 B2 | 11/2003 | Angel | |
| 6,792,460 B2* | 9/2004 | Oulu et al. | 717/130 |
| 6,918,110 B2 | 7/2005 | Hundt | |
| 7,263,689 B1 | 8/2007 | Edwards | |
| 7,281,242 B2 | 10/2007 | Inamdar | |
| 7,392,515 B2* | 6/2008 | Kimelman et al. | 717/158 |
| 7,493,622 B2* | 2/2009 | Borkan | 717/130 |
| 2003/0028858 A1* | 2/2003 | Hines | 717/130 |
| 2004/0060043 A1* | 3/2004 | Frysinger et al. | 717/158 |
| 2004/0078691 A1 | 4/2004 | Cirne | |
| 2004/0123279 A1 | 6/2004 | Boykin | |
| 2004/0215768 A1* | 10/2004 | Oulu et al. | 709/224 |
| 2005/0039172 A1* | 2/2005 | Rees et al. | 717/130 |
| 2005/0251790 A1 | 11/2005 | Hundt | |
| 2007/0006168 A1 | 1/2007 | Dimpsey | |
| 2007/0168998 A1 | 7/2007 | Mehta | |
| 2007/0261034 A1* | 11/2007 | Chen et al. | 717/130 |

(Continued)

OTHER PUBLICATIONS

Ben L. Titzer et al., Nonintrusive Precision Instrumentation of Microcontroller Software, Jun. 15-17, 2005, [Retrieved on Jun. 21, 2012]. Retrieved from the internet: <URL: http://dl.acm.org/citation.cfm?id=1065919> 10 Pages (59-68).*

(Continued)

*Primary Examiner* — Don Wong
*Assistant Examiner* — Anibal Rivera
(74) *Attorney, Agent, or Firm* — Vierra Magen Marcus & DeNiro LLP

(57) ABSTRACT

Instrumentation is dynamically added to application components during runtime. An interestingness engine receives inputs from various sources which identify software components such as classes for which it is desired to provide instrumentation. The sources can include a heuristics engine which receives performance data from already-instrumented components, a user interface from which a user identifies component to be instrumented or de-instrumented, and a static list of components to be instrumented. During the runtime, instrumentation can be added to components which become interesting, or removed from components which become not interesting. When loading or redefining a component, if a component type matches rules, it is eligible for instrumentation, and the interestingness engine is consulted to determine whether the component is of interest, in which case instrumentation is added. If a component type does not match rules, but the component is interesting, the rules can be updated to include the component type.

24 Claims, 7 Drawing Sheets

U.S. PATENT DOCUMENTS

2008/0052696 A1 2/2008 Pradadarao
2008/0276227 A1* 11/2008 Greifeneder .................. 717/130

OTHER PUBLICATIONS

Anita Goel et al., Probe Mechanism for Object-Oriented Software Testing, 2003, [Retrieved on Jun. 21, 2012]. Retrieved from the internet: <URL: http://www.springerlink.com/content/fj9jq3ppbya1pvpc/fulltext.pdf> 15 Pages (310-324).*

Marek Olszewski et al., A Dynamic Instrumentation Approach to Software Transactional Memory, 2007, [Retrieved on Jun. 21, 2012]. Retrieved from the internet: <URL: http://www.eecg.utoronto.ca/~steffan/papers/olszewski_masc_thesis.pdf> 86 Pages (1-78).*

Almasri, et al., "Dynamic instrumentation for the management of EJB-based applications," Inria, France, No. 4481 Jun. 4, 2002, Theme 1.

Dmitriev, "Design of JFluid: A Profiling Technology and Tool Based on Dynamic Bytecode Instrumentation," Sun Microsystems, Mountain View, California, Nov. 17, 2003.

Formanek et al., "Dynamic Bytecode Instrumentation," www.ddj.com/development-tools/184406433, Feb. 1, 2006.

Lee, et al., "BIT: A Tool for instrumenting Java Bytecodes," Proceedings of the Usenix Symposium on Internet Technologies and Systems, Monterey, California, Dec. 1997.

Liang, et al., "Dynamic Class Loading in the Java Virtual Machine," In Proc., 13th ACM Conference on Object-Oriented Programming, Systems, Languages, and Applications (OOPSLA'98), vol. 33, No. 10 of ACM SIGPLAN Notices (1998).

Reiss, et al. "Languages for dynamic instrumentation," In Proceedings of the Workshop on Dynamic Analysis (WODA), pp. 6-9 (2003).

* cited by examiner

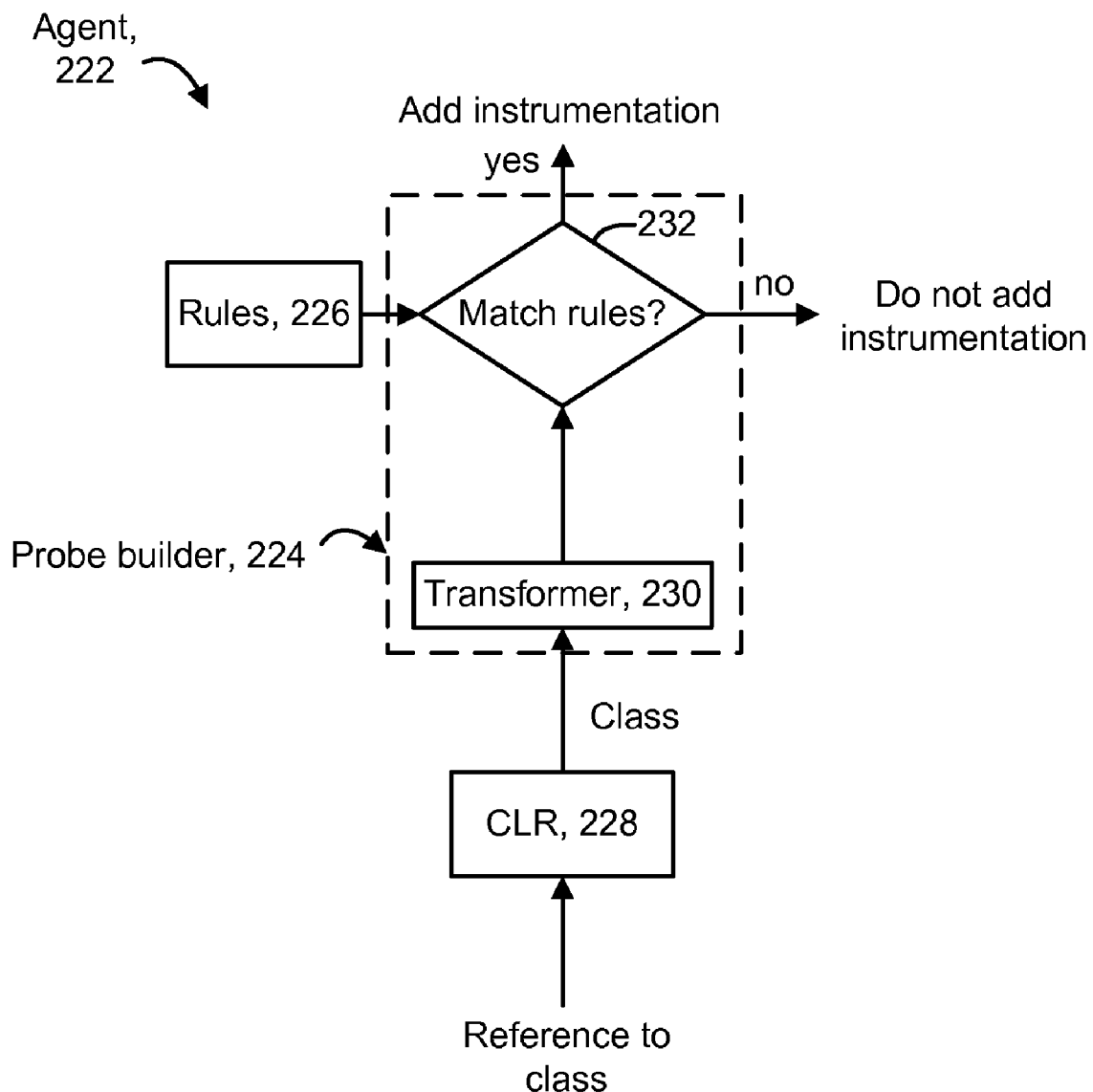

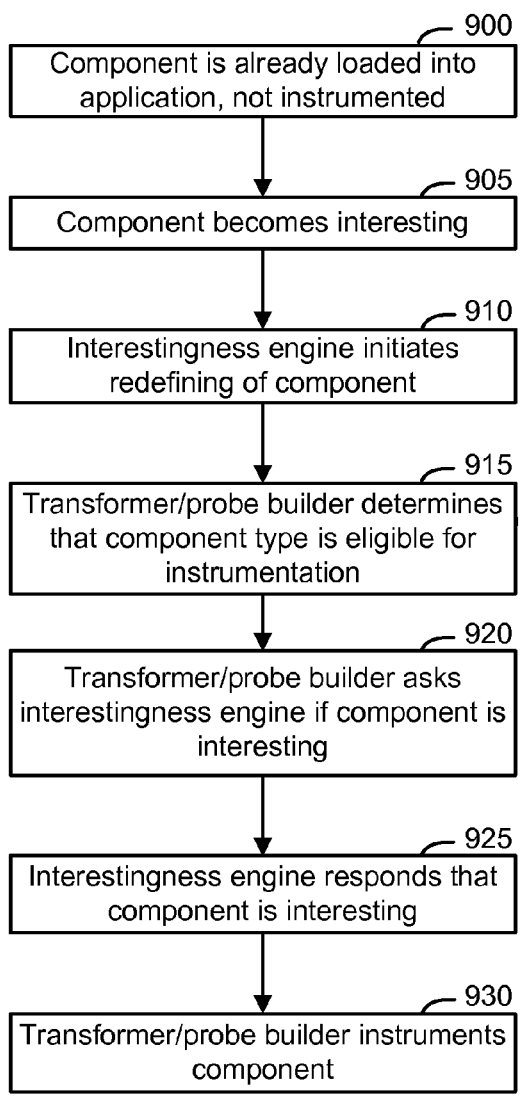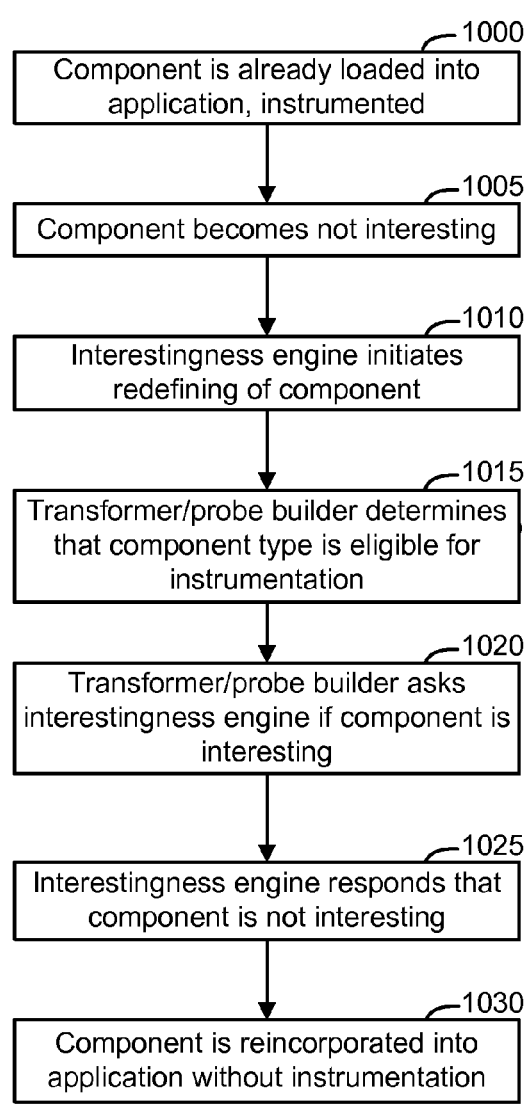

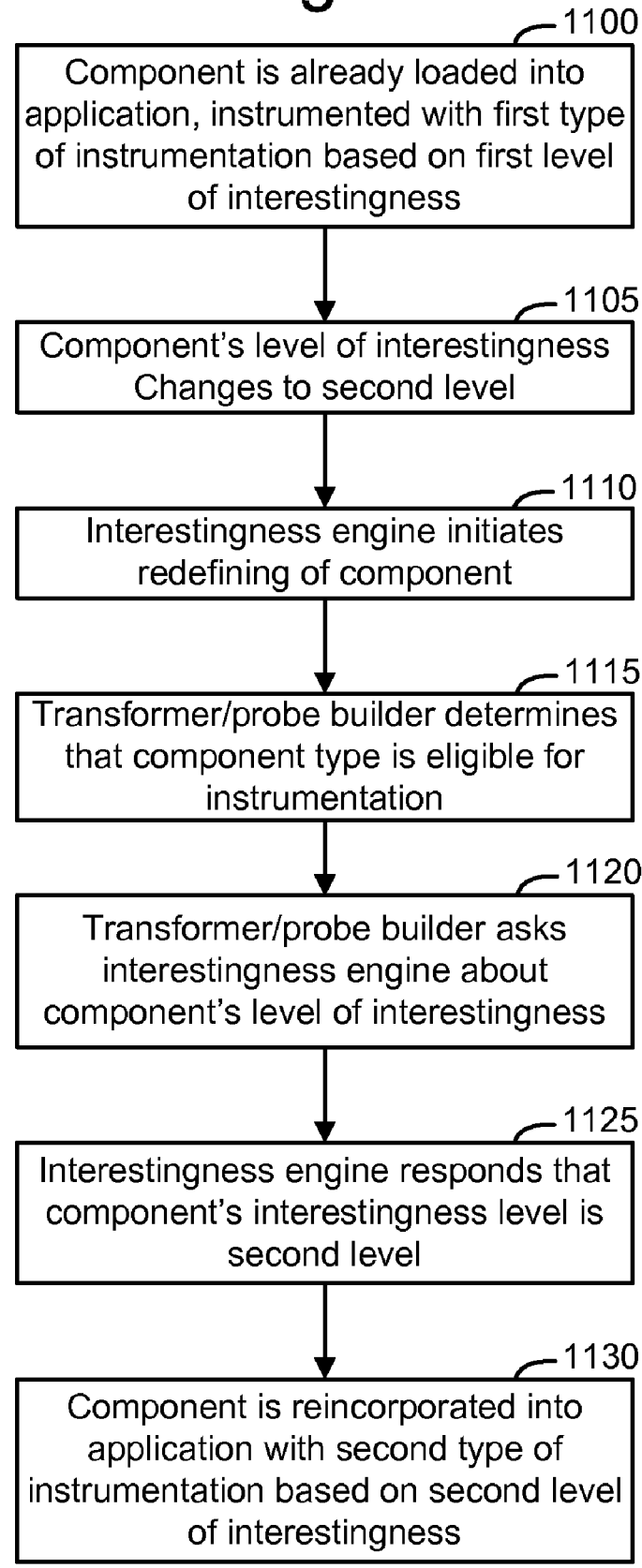

INTELLIGENT ENGINE FOR DYNAMIC AND RULE BASED INSTRUMENTATION OF SOFTWARE

BACKGROUND OF THE INVENTION

1. Field of the Invention

The present invention is directed to technology for monitoring software in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed.

One approach involves monitoring the infrastructure of the application by collecting application runtime data regarding the individual software components that are invoked in the application. This approach can use agents that essentially live in the system being monitored. For example, using instrumentation of the software, a thread or process can be traced to identify each component that is invoked, as well as to obtain runtime data such as the execution time of each component. Tracing refers to obtaining a detailed record, or trace, of the steps a computer program executes. One type of trace is a stack trace. Traces can be used as an aid in debugging. However, deciding which components to instrument can be problematic. An over inclusive approach can result in excessive overhead costs and possibly impair the operation of the application, while an under inclusive approach can result in the omission of important performance data.

SUMMARY OF THE INVENTION

The present invention provides a technique for monitoring software which addresses the above and other issues.

In one embodiment, a computer-implemented method for configuring instrumentation includes identifying at least one component of interest of an application, and responsive to the identifying, storing information which indicates that the at least one component is of interest. If the at least one component is not already loaded into the application during a runtime of the application, the method further includes: (a) loading the at least one component into the application, (b) accessing rules to determine whether a type of the at least one component is eligible to be instrumented, where the rules identify at least one component type which is eligible to be instrumented, (c) if, responsive to step (b), the type of the at least one component is eligible to be instrumented, accessing the information to determine that the at least one component has been identified as being of interest, and (d) responsive to determining that the at least one component has been identified as being of interest in step (c), instrumenting the at least one component.

In another embodiment, a computer-implemented method for configuring instrumentation includes: (a) identifying at least one component of interest of a running application, (b) responsive to the identifying, storing information which indicates that the at least one component is of interest, (c) accessing rules to determine whether a type of the at least one component is eligible to be instrumented, where the rules identify at least one component type which is eligible to be instrumented, (d) accessing the information to determine that the at least one component has been identified as being of interest, and (e) responsive to the determining that the at least one component has been identified as being of interest, and if the type of the at least one component is eligible to be instrumented, dynamically instrumenting or re-instrumenting the at least one component.

In another embodiment, a computer-readable medium having computer-executable components includes: a data provider component, an interestingness engine component, a class loader component, and an instrumentation component. The data provider component provides data to the interestingness engine component, where the data identifies one or more classes of an application for which instrumentation is desired. The interestingness engine component updates a list of interesting classes based on the data. Also, when loading the one or more classes, the class loader component provides a query to the instrumentation component regarding whether instrumentation should be added to the one or more classes.

Corresponding methods, systems and computer- or processor-readable storage devices which include a storage media encoded with instructions which, when executed, perform the methods provided herein, may be provided.

BRIEF DESCRIPTION OF THE DRAWINGS

FIG. 2b depicts a .NET-based example process flow for static instrumentation.

FIG. 9 depicts an example process for redefining a component which is already loaded into an application but not instrumented.

FIG. 10 depicts an example process for redefining a component which is already loaded into an application and instrumented.

FIG. 11 depicts an example process for redefining a component which is already loaded into an application and instrumented at a first level.

DETAILED DESCRIPTION

The present invention provides a technique for monitoring software in which instrumentation can be dynamically modified during a runtime of the software.

Figure 1:
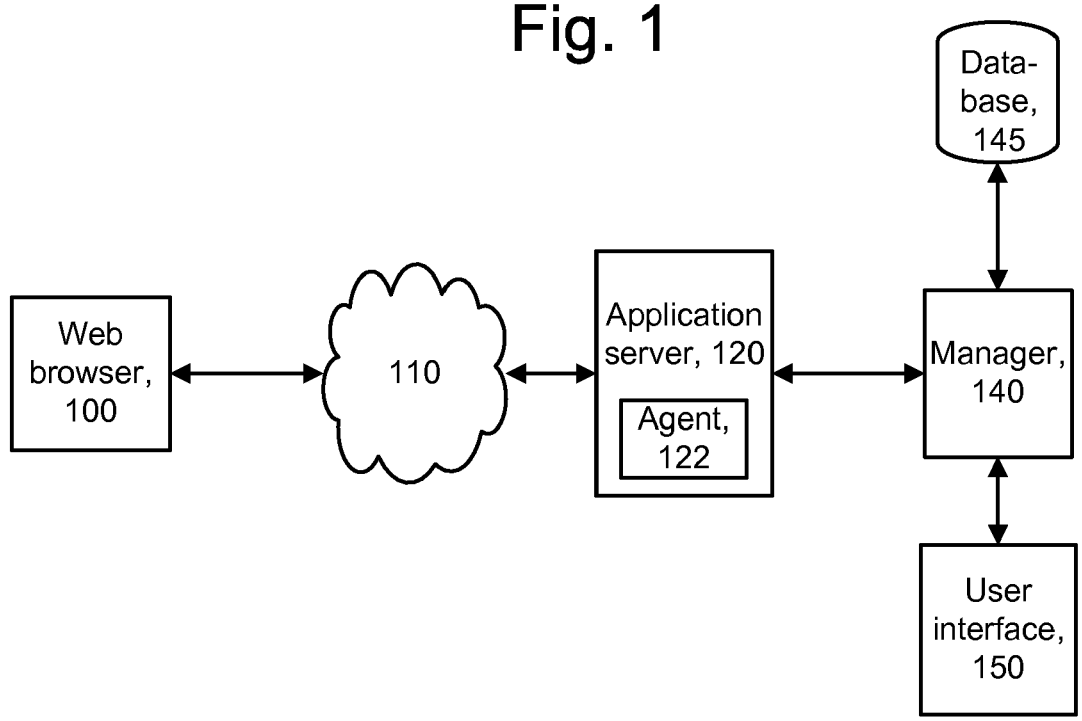
FIG. 1 depicts a system which includes a managed application.

FIG. 1 depicts a system which includes a managed application. An example computer system may include one or more application servers, such as application server 120, or any other type of computer system having a processor for executing code to achieve a desired functionality. In the example provided, the application server communicates with a local manager computer 140. Moreover, a corporation running an enterprise application such as a web-based e-commerce application may employ a number of application servers at one location for load balancing.

For a web-based e-commerce application, for instance, a transaction at an application server is typically initiated by a request to the server, such as a user request to purchase an item. The process may invoke a number of processes to carry out the steps necessary to allow the user to purchase the item. For example, a shopping cart process may be used to allow the user to identify the item desired, the payment method and the shipping information. A reservation process may be used to reserve the item while a credit check process verifies the user's credit card information. Once the credit card information is verified, an inventory is updated based on the item purchased, and a shipping process is invoked to arrange for the item to be shipped, such as by contacting a warehouse. An order completion process may be invoked to confirm the purchase to the user such as by providing an order confirmation number and a tracking number on a web page. However, the discussion of a web-based application is an example only as any type of application or software may be managed.

Requests from users, such as from an example web browser 100 of a user, are received via a network cloud 110 such as the Internet, and routed to the application server 120. The web browser 100 typically accesses the network cloud 110 via an Internet Service Provider, not shown. In one possible architecture, agent software running on the application server 120, denoted by agent 122, gathers information from the application, middleware or other software, running on the application server 120. For example, such information may be obtained using instrumentation such as byte code instrumentation. The agent 122 essentially lives in the system being monitored and provides a data acquisition point. The agent 122 organizes and optimizes the data communicated to the manager 140. In other possible architectures, the agent can be at any location, including outside the application server or other computing machine which is being managed.

Various approaches are known for instrumenting software to monitor its execution. For example, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 140, or process the information locally, such as to determine whether the information indicates an abnormal condition. For example, the information from the probes may indicate start and stop times of a transaction, or of individual components within a transaction. This information can be compared to pre-established criteria to determine if it within bounds. If the information is not within bounds, the agent 122 can report this fact to the manager 140 so that appropriate troubleshooting can be performed. The agent 122 is typically aware of the software executing on the local computer system 120 with which it is associated.

The manager 140 can be provided on a separate host computer such as a workstation which communicates with a user interface 150, such as a monitor, to display information based on data reported by the agent 122. The user interface 150 can include an input device such as a keyboard, mouse or other pointing device, which allows a user to access and manipulate the information. The use can also use the user interface 150 to identify components of interest, as discussed further below in connection with FIG. 6. The manager 140 can also access a database 145 to store the data received from the agent 122. In the example provided, the application server 120 can communicate with the manager 140 without accessing the network cloud 110, such as via a local area network. In other designs, the manager 140 can receive data from the agent via the network cloud 110. For instance, some large organizations employ a central network operations center where one or more managers obtain data from a number of distributed agents at different geographic locations. Other applications which are not necessarily web-based can similarly employ agents and managers for managing their systems. Moreover, a multi-host can be monitored as well as a single host with one or more agents. Further, one or more applications on a host can be managed.

Figure 2A:
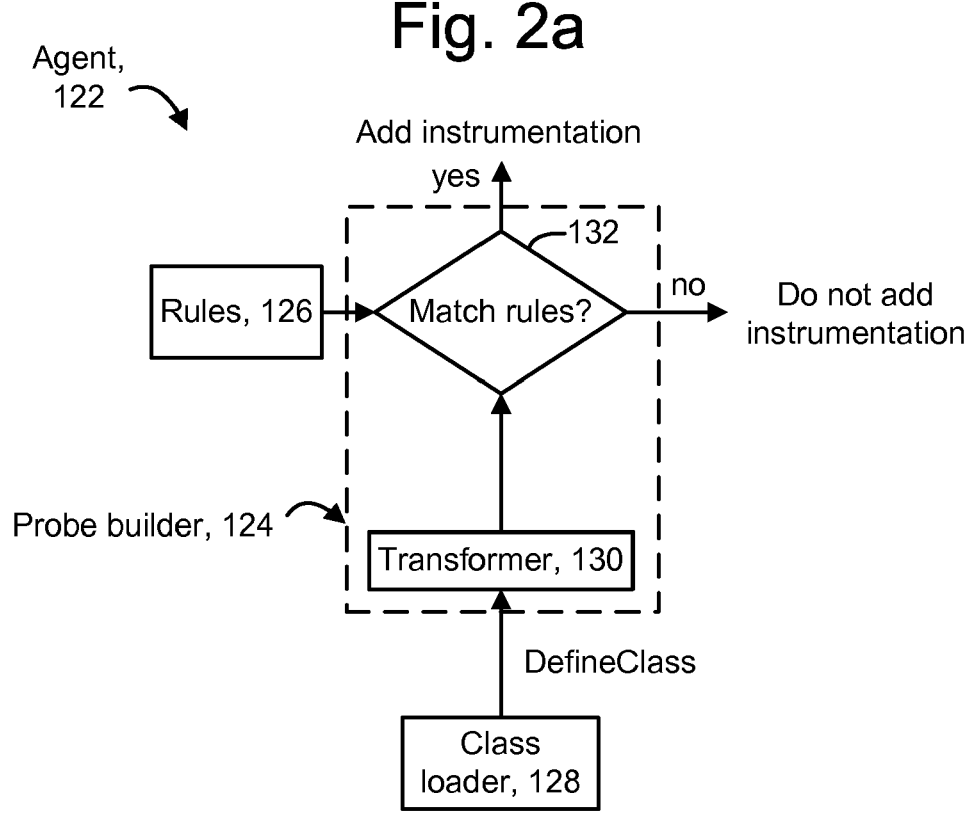
FIG. 2a depicts a JAVA-based example process flow for static instrumentation.

FIG. 2a depicts a JAVA-based example process flow for static instrumentation. The process may be implemented by the agent 122, in one possible approach. One approach to instrumentation involves providing static rules which determine which components are to be instrumented. The rules are accessed at the time the components are loaded into the application. In such an approach, a class loader 128 is used to provide raw data bytes of an application byte code to a transformer 130, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 130 is thus software which can transform byte code to add instrumentation, such as by transforming classes. In one approach, the minimum unit of processing of the transformer 130 is a class file and its byte array.

If the application byte code matches rules, e.g., directives, 126 at a decision block 132, the transformer 130 adds probes in the form of tracer byte code. If the application byte code does not matches the rules 126 at the decision block 132, the transformer 130 does not add instrumentation to the byte code. The transformer 130 and the decision block 132 may be considered to be part of a probe builder 124.

In this implementation, the rules 126 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting. The data may be interesting for different reasons; for example, a component may be running slowly, or it may be part of a process that has generated an error.

For instance, a rule may indicate that all servlets should be instrumented since it is believed that at least some of the servlets may provide interesting data. In this case, the rules 126 may indicate that all components that are subclasses of the JAVA class HttpServlet should be instrumented. HttpServlet is an abstract class from which all servlets depend.

However, this approach results in instrumenting every servlet, including those which are not expected to provide interesting data. Moreover, more than one application may be running at a time, in which case all servlets are instrumented for all applications, even if only a few servlets for one particular application are of interest. In such cases, the instrumentation decision making process is over inclusive and inflexible.

Over inclusive instrumentation results in excessive overhead costs and possibly impairing the operation of the application, while under inclusive instrumentation results in the omission of important performance data. Further, the use of static rules alone to provide instrumentation does not provide the capability to dynamically change the instrumentation during the application's runtime.

FIG. 2b depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, s other implementations are possible.

Here, the process may be implemented by an agent 222, in one possible approach. In one possible scenario, some process in the .NET framework references a class by name, and the CLR 228 finds the class, shows it to a transformer 230 (if any) and uses the resultant CIL. In particular, if the class matches rules 226 at a decision block 232, instrumentation is added. If the class does not match the rules 226 at the decision block 232, instrumentation is not added. The transformer 230 and the decision block 232 may be considered to be part of a probe builder 224.

Figure 3:
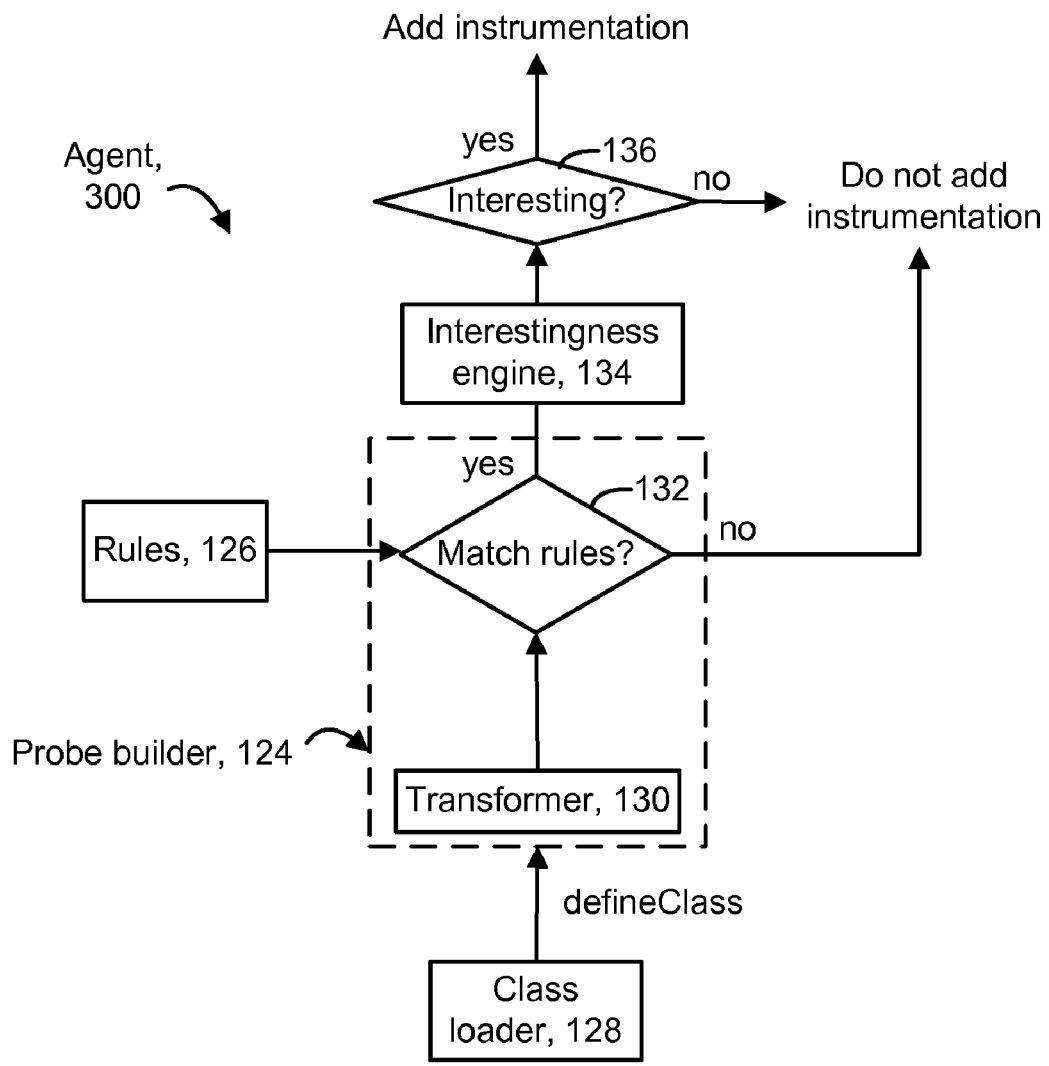
FIG. 3 depicts an example process flow for a dynamic instrumentation process.
Figure 4:
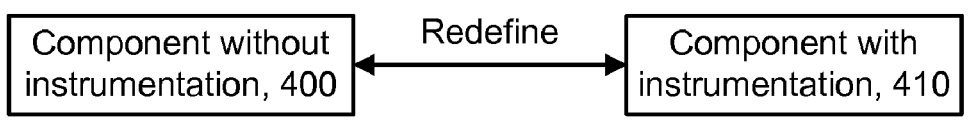
FIG. 4 depicts redefining a class.

FIG. 3 depicts an example process flow for a dynamic instrumentation process. This process differs from that in FIG. 2a in that an interestingness engine 134 is used to indicate whether a component which is being loaded is interesting, and therefore, whether it is desired to instrument the component. The example embodiment of FIG. 2b can similarly be modified. Here, it is also assumed that the component matches the rules at decision block 132. Based on this information, a decision block 136 can decide to add instrumentation if the component is interesting, or not add instrumentation if the component is not interesting. For example, the interestingness engine 134 may maintain a dynamically updatable list of classes or other components which are interesting, based on various inputs, discussed further below. The interestingness engine 134 allows a component to be redefined, so that it transitions, e.g., from not having instrumentation at one point in time, as depicted by block 400 in FIG. 4, to having instrumentation at another point in time, as depicted by block 410. Similarly, a component can transition from block 410 to 400. It is also possible to have different types or levels of instrumentation, e.g., a high level of instrumentation, in which many aspects of the performance of a component are tracked, and a low level of instrumentation, in which only a few aspects of the performance of a component are tracked. Redefining a component can thus involve a transition to a different type of instrumentation.

Instrumentation can yield many types of data, including an average execution time of a component, an invocation rate per second or per interval, a count of invocations, a concurrency metric indicating a number of invocations that have started but not finished per interval, and a stalled metric indicating a number of invocations that have started whose method invocation times have exceeded a specific threshold per interval. Further, the data can identify a garbage collection heap size, a bandwidth metric indicating file and socket activity, a number of threads, system logs, exceptions, memory leaks and component interactions. The data can also identify which components are called by the instrumented component or which call the instrumented component. For instance, in a controller architecture, control flows in through a controller component, which has control over which components are executed next, and knows how often they are executing and how they are performing. The controller component can report, via instrumentation, on which uninstrumented components are being frequently invoked and therefore are perhaps of interest and should be redefined to add instrumentation.

As mentioned, it is possible to redefine a component to change its type of instrumentation. For example, more instrumentation may be added when the existing instrumentation detects a problem, e.g., due to one or more parameters being out of bounds. Also, the additional instrumentation may be subsequently removed when the instrumentation establishes that a normal condition has returned.

Figure 5:
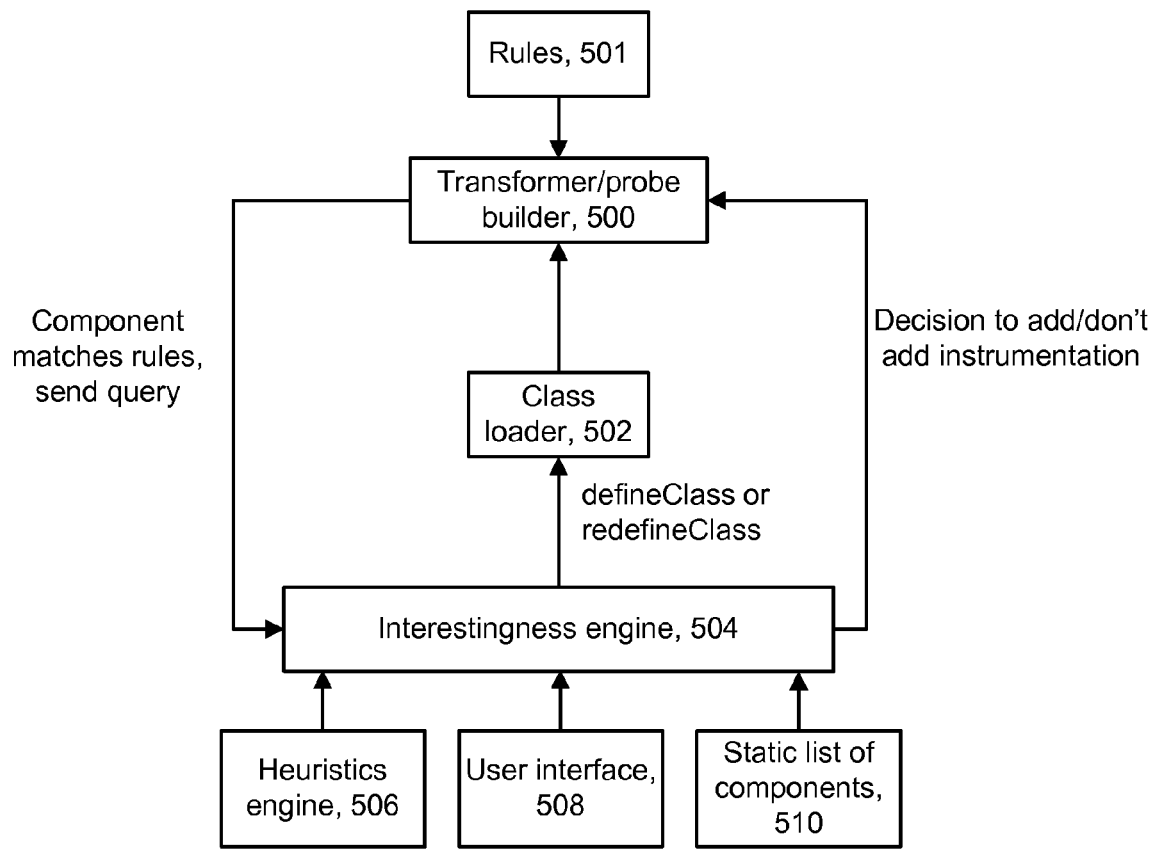
FIG. 5 depicts an example process flow of the lifecycle of a dynamic instrumentation process.

FIG. 5 depicts an example process flow of the lifecycle of a dynamic instrumentation process. An interestingness engine 504 receives different inputs which define whether or not components of an application are interesting, and/or a degree to which they are interesting. These inputs can change over time to accommodate changes in the application. In one possible approach, the interestingness engine 504 receives data from a heuristics engine 506, a user interface 508 and a static list of components 510. The heuristics engine 506 can monitor performance data which is flowing in from the existing instrumentation in the managed application and identify, for instance, the fact that some components are causing a problem in a transaction, such as taking too much time to execute. The performance data can be compared to lower and upper thresholds to determine whether it is out of bounds. Note that the interestingness engine 504, heuristics engine 506, user interface 508 and static list of classes 510 can be provided at the application server 120 (FIG. 1) or at another location. For example, the heuristics engine 506 may be associated with the manager 140, which receives performance data from instrumentation, and the user interface 508 can be provided at the user interface host 150.

Referring to FIG. 5, the heuristics engine 506 provides an idea of what components are involved in a problem transaction and it tells the interestingness engine 504 that these are the components that could be causing, or are causing, issues and that could therefore be interesting. In response, the interestingness engine 504 initiates a procedure for adding instrumentation to those components. There are different ways of doing this. In one approach, a lightweight instrumentation is first used, where only certain critical points are instrumented. Later, additional instrumentation may be added as more performance data from the application is needed and additional components are involved.

Figure 6:
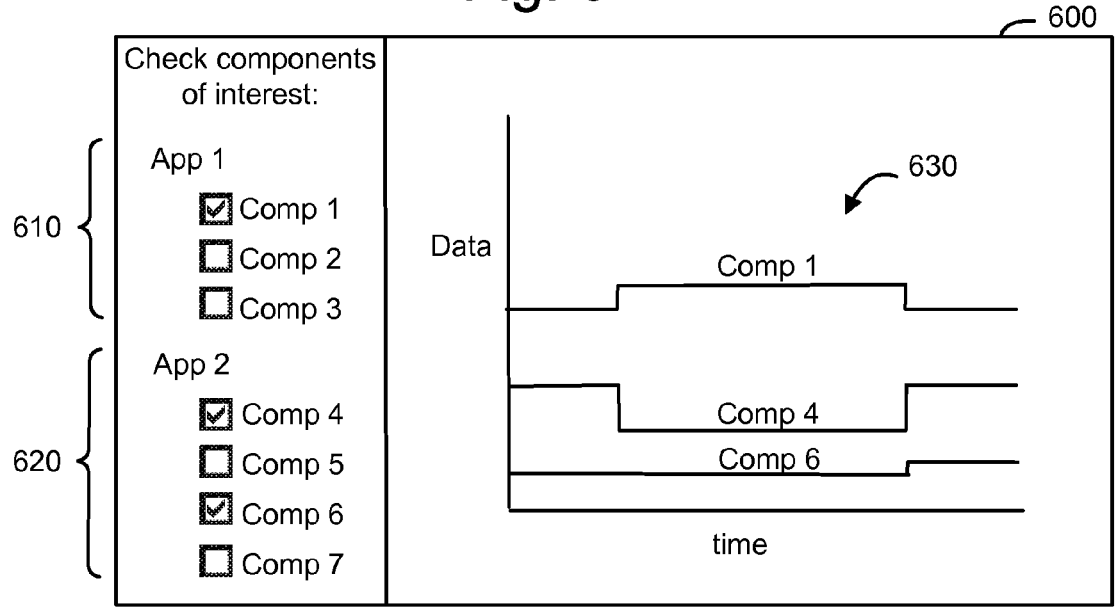
FIG. 6 depicts a user interface by which a user can manually identify a component as being interesting or not interesting.

The user interface 508 allows a user to manually pick and choose which components are to be instrumented or not instrumented, for instance. The type of instrumentation could also be specified via the user interface. For example, FIG. 6 depicts a user interface 600 by which a user can manually identify a component as being interesting or not interesting. The user interface 600 can be automatically populated with each of the components in the application using a hierarchical structure such as a tree. The user can expand nodes of the tree to view lower levels components of a node. In this simplified example, region 610 indicates that a first application (App 1) has components Comp 1, Comp 2 and Comp 3, and region 620 indicates that a second application (App 2) has components Comp 4, Comp 5, Comp 6 and Comp 7. For example, the components may be classes of the respective applications.

Further, a check box next to each component allows the user to specify that a component is to have instrumentation added, such as by checking the box. Similarly, the user can uncheck a checked box to indicate that instrumentation should be removed from a component. For specifying different types of instrumentation, additional checkboxes or other user interface techniques may be used. Moreover, when the user initially views the user interface 600, the checkboxes can be pre-checked or unchecked according to their current instrumentation status. In some cases, a checkbox may be grayed out to indicate that the instrumentation status of a component can not be changed, e.g., so that instrumentation is not inadvertently removed from critical components. A region 630 of the user interface 600 optionally provides transaction traces of the instrumented components based on the instrumentation.

The user may indicate that instrumentation should be added to certain components based on, e.g., observations of which components are involved in errors or have themselves generated an error, prior troubleshooting experience and other factors.

The static list of components 510 may include classes or other components which are to be instrumented when the application begins running. This may be a baseline list of components which are expected to yield important data. In response to the various inputs, which can be provided over time, the interestingness engine 504 maintains a list of components which have been deemed to be interesting and therefore worthy of instrumenting. The list of interesting components can be persisted so that the next time the system starts up, the same components are instrumented. This allows the user to have constant data, reporting and metrics from a component, and provides a good way to allow the user to set up the environment.

The interestingness engine 504 can redefine a component in different ways according to whether the component has already been incorporated into the application at runtime. If a component which has been deemed to be interesting is not already incorporated into the application, it can be incorporated normally by being loaded by a class loader 502 such as in a JAVA Virtual Machine (JVM), in one possible implementation. That is, the interestingness engine does not initiate the loading. In other implementations, such as those which use the .NET framework, a class loader is not used.

The interestingness engine 504 may be an extension of a transformer/probe builder 500, and may interrupt decisions of the transformer/probe builder 500 regarding instrumentation, so that the transformer/probe builder 500 consults the interestingness engine before deciding whether to add instrumentation. The interestingness engine thus becomes a participant in the instrumentation decision-making process. This allows an existing instrumentation process which is represented by the transformer/probe builder 500 to be modified to include additional intelligence. The intelligence is added to supplement and/or modify the rules 501 which the transformer/probe builder 500 uses, such as "instrument all servlets." Further, in one approach, the interestingness engine 504 does not talk to the transformer/probe builder 500 directly, but the transformer/probe builder 500 can talk with the interestingness engine 504, e.g., by inter-process or inter-thread communication techniques. That is, the interestingness engine 504 may not directly call or command the transformer/probe builder 500 to transform a class to add instrumentation, but it indirectly controls the transformer/probe builder when the transformer/probe builder asks the interestingness engine whether to add instrumentation.

The interestingness engine could also be at a different host machine than the transformer/probe builder in which case they may communicate using networking communication techniques.

When a component is loaded, the transformer/probe builder 500 accesses the rules 501 to determine whether the component matches the rules, e.g., whether the component is a certain type which is on the list. A component in a JAVA 2 PLATFORM, ENTERPRISE EDITION (J2EE) of SUN MICROSYSTEMS, or other application, can be of various types including: servlet, JAVA SERVER PAGE (JSP), ENTERPRISE JAVA BEAN (EJB), JAVA MESSAGE QUEUE, JAVA MESSAGE TOPIC, JAVA MESSAGE LISTENER, database connection, and query. Custom types are also possible. The rules can be associated with components or instances of components of the application. In many cases, the names of the classes of an application which is being monitored are not known to the instrumentation software, but the types of components of the application are known. Component types that implement a behavior can be provided in the rules 501.

If the component matches the rules 501, the transformer/probe builder 500 provides a query to the interestingness engine 504 to determine whether the component is of interest. The interestingness engine 504 accesses its records, which can be dynamically and adaptively updated over time, and reports back with a decision to instrument or not instrument the component, for instance. A type of instrumentation to use could also be specified by the interestingness engine 504. The transformer/probe builder 500 adds instrumentation to the component if instructed to do so by the interestingness engine 504. The transformer/probe builder 500 could also add the specified type of instrumentation as instructed by the interestingness engine 504. Likewise, the transformer/probe builder 500 does not add instrumentation to the component if instructed not to do so by the interestingness engine 504.

Optionally, the transformer/probe builder 500 can simply query the interestingness engine 504 to determine whether the component is of interest. If the component is of interest, it is instrumented.

Note that if the transformer/probe builder 500 determines that the component does not match the rules, it is possible to update the rules to include the component type. In this case, the transformer/probe builder 500 may first contact the interestingness engine 504 to determine whether the component is interesting. If the component is interesting, the rule can be updated to include a type of the component, and the component can be instrumented.

If a component has been deemed to be interesting at a point in time at which the component is already incorporated into the application, but is not instrumented, it can be reincorporated into the application with instrumentation. For example, the component can be removed from the application and reloaded during the runtime without restarting the virtual machine. To achieve this, the interestingness engine 504 may provide the JAVA redefineClass command to the class loader 502. The JAVA DEVELOPMENT KIT (JDK) version 1.5 or higher has a redefinition capability which uses this command. This command redefines a supplied set of classes using supplied class files. It operates on a set in order to allow interlocked changes to more than one class at the same time. Moreover, if a redefined method has active stack frames, those active frames continue to run the byte codes of the original method, and the redefined method will be used on new invokes.

Redefining a component such as a class is analogous to restarting the virtual machine but only for that class. When a class is redefined, if the class is already in existing method stacks, it stays there. But, for every new method invocation, the new class is used. That is, once it is redefined, the new version is picked up.

When the transformer/probe builder 500 receives the redefined component, it accesses the rules 501 to determine whether the component matches the rules, e.g., whether the component is a certain type, such as a servlet. If the component matches the rules, the transformer/probe builder 500 provides a query to the interestingness engine 504 to determine whether the component is of interest. The interestingness engine 504 accesses its records and reports back with a decision to instrument or not instrument the component, for instance, if it is of interest or not of interest, respectively. The transformer/probe builder 500 adds instrumentation to the component if instructed to do so by the interestingness engine 504. The transformer/probe builder 500 could also add a type of instrumentation to the component as specified by the interestingness engine 504. Likewise, the transformer/probe builder 500 does not add instrumentation to the component if not instructed to do so by the interestingness engine 504.

Similarly, if a component which has been deemed to be interesting to a first degree is already incorporated into the application, and is instrumented with one level or type of instrumentation, and if the component is subsequently deemed to be interesting to a second degree, it can be reincorporated into the application with a different level or type of instrumentation. Also, if a component which has been deemed to be interesting is already incorporated into the application, and is instrumented, and if the component is subsequently deemed to be not interesting, it can be reincorporated into the application without instrumentation. The dynamic instrumentation process is detailed further in the following flowcharts. The interestingness engine 504 thus adds an intelligence to the decision making process of determining what components are instrumented, and how they are instrumented.

As mentioned, some types of components may not match the rules 501, in which case the rules can be updated to add the component type, and the component can be instrumented at the same time. For example, known types of components such as servlets may be defined in the rules, but a custom application component that a user has provided may not be defined in any specification. In such a case, the interestingness engine 504 can be updated to identify the component as being interesting, and the rules 501 can be updated to identify the component as being of a type which is eligible to be instrumented, if the additional criteria of being interesting is met. If the component is a base component such as a class, all classes extending from the base component can be instrumented, or only certain specified components extending from the base component can be instrumented. This can be done dynamically at runtime so that the virtual machine in which the byte code is executing does not have to be brought down, and data from the instrumented components can be accessed immediately.

Figure 7:
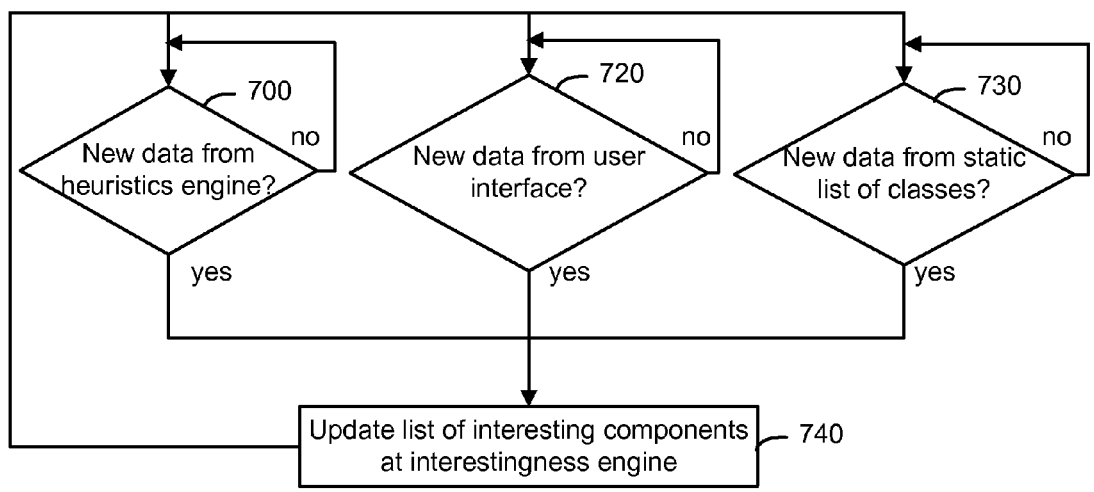
FIG. 7 depicts an example process for updating a list of interesting components of an interestingness engine.

FIG. 7 depicts an example process for updating a list of interesting components of an interestingness engine. At step 740, a list of interesting components can be dynamically updated over time based on new data from various sources of information, including new data from a heuristics engine (decision step 700), new data from a user interface (decision step 720) and new data from a static list of classes (decision step 730), such as an updated or new list. The process for updating the list of interesting components at the interestingness engine can occur independently from processes for loading and reincorporating objects into an application during the application runtime. The process for updating the interestingness engine can occur before, during and/or after the runtime.

Figure 8:
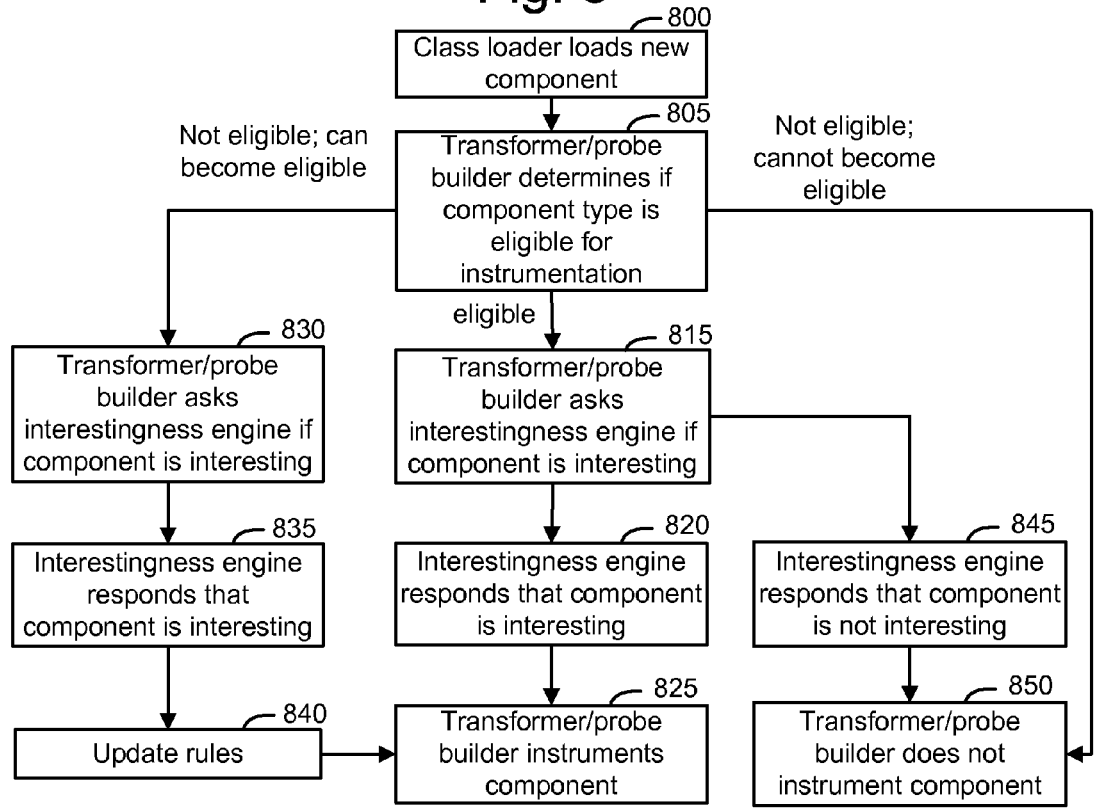
FIG. 8 depicts an example process for loading a new component into an application using an interestingness engine.

FIG. 8 depicts a process for loading a new component into an application using an interestingness engine. At step 800, the class loader loads a new component. At step 805, the transformer/probe builder determines if the component is of a type which is eligible for instrumentation, e.g., based on the one or more types specified in the rules. Three options are possible. In one option, the type is eligible, and step 815 is followed next. Step 815 includes the transformer/probe builder asking the interestingness engine if the component is interesting. At step 820, the interestingness engine checks its list of interesting components and responds that the component is interesting. At step 825, the transformer/probe builder instruments the component, at which time the component is now incorporated into the application runtime. If instead, at step 845, the interestingness engine responds that the component is not interesting, step 850 includes the transformer/probe builder not instrumenting the component, so that the uninstrumented component is incorporated into the application runtime.

In a second option at step 805, the component type is not eligible based on the current rules, but there is a possibility of the type becoming eligible. In this option, step 830 is followed next. Step 830 includes the transformer/probe builder asking the interestingness engine if the component is interesting. At step 835, the interestingness engine checks its list of interesting components and responds that the component is interesting, in this particular example. At step 840, the transformer/probe builder updates the rules to include the type of the component. At step 825, the transformer/probe builder instruments the component, as discussed.

In a third option, the component is not eligible based on the rules and its eligibility is not reconsidered. In this option, step 850 is followed next. Step 850 includes the transformer/probe builder not instrumenting the component, so that the uninstrumented component is incorporated into the application runtime.

As an example, assume a data provider of the interestingness engine finds two classes that are interesting, where one of them is a random class and one is a servlet. Assume the rules are currently set up to qualify servlets for instrumentation but nothing else. Based on the input, the interestingness engine updates its records to identify these classes as interesting, and provides the classes to the class loader, which provides them to the probe builder/transformer to give it a chance to transform the bytes. However, the probe builder/transformer looks at its rules and realizes that it is only configured to work with servlets, so it does not do anything to the random class. It lets it pass by and does not transform it. But, the probe builder/transformer recognizes that the servlet class does match the rules, and asks the interestingness engine if it should insert byte code instrumentation. It wants to know if the particular servlet class is interesting. The interestingness engine has set the particular servlet class as being interesting based on the input from the data provider, so the interestingness engine tells the transformer/probe builder to go ahead and set tracers to instrument the servlet.

Thus, for the interesting servlet, the transformer/probe builder does not automatically add instrumentation. It matches it against the rules by just checking whether it is a servlet or not. That is the first filter. If it is a servlet, the probe builder asks the interestingness engine whether the class is interesting. This is the second filter.

To allow the random class to also be eligible for instrumentation, the system can be set up so that when a class that is interesting is not eligible for instrumentation based on the rules, a new rule is added at run time to provide such eligibility.

FIG. 9 depicts an example process for redefining a component which is already loaded into an application but not instrumented, as depicted at step 900. At step 905, the component becomes interesting. That is, the interestingness engine receives information from data sources, such as the heuristics engine 506, user interface 508 or static list 510 (FIG. 5) which identifies a component which has become interesting. At step 910, the interestingness engine initiates a redefining of the component, such as by passing the JAVA redefineClass command to the class loader. In response to the command, at step 915, the transformer/probe builder determines that the component type is eligible for instrumentation because the type is prescribed by the rules, in this example. If the component does not meet rules, steps which are analogous to steps 830, 835 and 840 in FIG. 8 may be followed to update the rules. At step 920, the transformer/probe builder asks the interestingness engine if the component is interesting. Although the process of FIG. 9 was initiated by the fact that the component became interesting, as mentioned, the interestingness engine does not communicate directly with the transformer/probe builder, so the transformer/probe builder does not know initially that the component is interesting. Instead, the transformer/probe builder just knows that a request to redefine the component has been issued.

At step 925, the interestingness engine checks its list of interesting components and responds that the component is interesting. At step 930, the transformer/probe builder instruments the component, at which time the component is now incorporated into the application runtime.

It is also possible for other actors to cause a redefine for reasons that are unrelated to interestingness. When a redefine is triggered in such cases, the actions are the same: the transformer gets invoked and it asks the interestingness engine if the class is interesting. If the class is interesting, it can be instrumented.

FIG. 10 depicts an example process for redefining a component which is already loaded into an application and instrumented, as depicted at step 1000. At step 1005, the component becomes not interesting. That is, the interestingness engine receives information from data sources which identifies the component as being no longer interesting. For example, a component B which is called by component A may have been identified by instrumentation of component A as being interesting when component B's invocation rate exceeded an upper threshold. In this case, instrumentation may have been added to component B to obtain additional information from it directly. Once the invocation rate falls below the upper threshold for a specified period of time, the component may no longer be of interest, in which case the instrumentation of component B is no longer needed.

At step 1010, the interestingness engine initiates a redefining of the component, such as by passing the JAVA redefineClass command to the class loader. In response to the command, at step 1015, the transformer/probe builder determines that the component is eligible for instrumentation because the type is prescribed by the rules, in this example. If the component does not meet rules, steps which are analogous to steps 830, 835 and 840 in FIG. 8 may be followed to update the rules. At step 1020, the transformer/probe builder asks the interestingness engine if the component is interesting. At step 1025, the interestingness engine checks its list of interesting components and responds that the component is not interesting. At step 1030, the component is reincorporated into the application without instrumentation. Optionally, the component can be reloaded without being instrumented.

FIG. 11 depicts an example process for redefining a component which is already loaded into an application and instrumented with a first type of instrumentation, as depicted at step 1100. At step 1105, the component's level of interestingness changes. That is, the interestingness engine receives information from data sources which indicate that the component's level of interestingness has changed, e.g., from the first to a second level. At step 1110, the interestingness engine initiates a redefining of the component, such as by passing the JAVA redefineClass command to the class loader. In response to the command, at step 1115, the transformer/probe builder determines that the component is eligible for instrumentation because the type is prescribed by the rules, in this example. If the component does not meet rules, steps which are analogous to steps 830, 835 and 840 in FIG. 8 may be followed to update the rules. At step 1120, the transformer/probe builder asks the interestingness engine about the component's level of interestingness. At step 1125, the interestingness engine checks its list of interesting components and responds that the component is interesting at a second level. At step 1130, the component is reincorporated into the application with a second type of instrumentation based on the second level of interestingness. Optionally, the component can be reloaded and provided with the second type of instrumentation.

The functionality described herein can be accomplished using hardware, software or a combination of both hardware and software. The software can be stored on one or more processor readable storage devices such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more storage devices, peripherals and/or communication interfaces.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for configuring instrumentation, comprising:
   loading a component of an application into a probe builder;
   providing rules to the probe builder, the rules comprise a directive to add instrumentation to a specified class of components;
   determining whether or not the component is in the specified class of components;
   if the rules indicate the component is in the specified class of components, accessing information which is dynamically updated based on performance data of the application to determine whether the component is of interest;
   if the rules indicate the component is in the specified class of components, and the information which is dynamically updated based on performance data of the application indicates the component is of interest, incorporating the component into the application with instrumentation; and
   if the rules indicate the component is in the specified class of components, and the information which is dynamically updated based on performance data of the application indicates the component is not of interest, incorporating the component into the application without instrumentation, instead of following the directive to add instrumentation.

2. The computer-implemented method of claim 1, further comprising:
   determining a degree to which the component is of interest, the instrumentation tracks relatively many aspects of performance of the component when the degree to which the component is of interest is relatively high, and relatively few aspects of performance of the component when the degree to which the component is of interest is relatively low.

3. The computer-implemented method of claim 1, further comprising:
   if the rules indicate the component is not in the specified class of components and the information which is dynamically updated based on performance data of the application indicates the component is not of interest, incorporating the component into the application without instrumentation and without updating the rules to identify the class of the component.

4. The computer-implemented method of claim 1, wherein:
   the specified class of components comprises at least one of a servlet component, Java Server Page (JSP) component, Enterprise Java Bean (EJB) component, Java Message component, database connection component and query component.

5. The computer-implemented method of claim 1, wherein:
   the information which is dynamically updated based on performance data of the application comprises a component invocation rate.

6. The computer-implemented method of claim 1, wherein:
   the information which is dynamically updated based on performance data of the application comprises a component processing time.

7. The computer-implemented method of claim 1, further comprising:
   determining when the component is no longer of interest based on performance data of the component;
   responsive to the determining that the component is no longer of interest based on performance data of the component: at agent software associated with the application, updating the information which is dynamically updated based on performance data of the application to indicate that the component is no longer of interest and initiating a redefining of the component by commanding a reload of the component into the application; and
   in response to the commanding the reload of the component, accessing the information which is dynamically updated based on performance data of the application to determine that the component is no longer of interest, and, in response to the determining that the component is no longer of interest, reincorporating the component into the application without instrumentation.

8. The computer-implemented method of claim 1, further comprising:
   determining when the component becomes of interest based on performance data of the application;
   responsive to the determining that the component becomes of interest: at agent software associated with the application, updating the information which is dynamically updated based on performance data of the application to indicate that the component is of interest, and initiating a redefining of the component by commanding a reload of the component into the application; and
   in response to the commanding the reload of the component, accessing the information which is dynamically updated based on performance data of the application to determine that the component is of interest, and, in response to the determining that the component is of interest, reincorporating the component into the application with instrumentation.

9. The computer-implemented method of claim 1, wherein:
   the component is in the specified class of components when the component is in a subclass of the specified class.

10. The computer-implemented method of claim 1, wherein:
    the component is in the specified class of components when the component implements a specified interface.

11. The computer-implemented method of claim 1, further comprising:
    at agent software associated with the application: if the rules indicate the component is not in the specified class of components, and the information which is dynamically updated based on performance data of the application indicates the component is of interest, updating the rules to identify a class of the component.

12. A computer-implemented method for configuring instrumentation, comprising:
    loading a component of an application into a virtual machine;
    determining whether the component is of interest based on performance data of the application and, responsive to the determining, updating a list of components which are of interest and triggering a redefining of the component, the redefining comprises:
    reloading the component into the virtual machine without restarting the virtual machine;
    responsive to the reloading, accessing the list to determine that the component is in the list; and
    responsive to the determining that the component is in the list, adding instrumentation to the component.

13. The computer-implemented method of claim 12, wherein:
    the loading the component into the virtual machine does not add instrumentation to the component; and the reloading the component into the virtual machine adds instrumentation to the component.

14. The computer-implemented method of claim 12, wherein:
the loading the component into the virtual machine adds one type of instrumentation to the component; and
the reloading the component into the virtual machine adds another type of instrumentation to the component, the another type of instrumentation is different than the one type of instrumentation.

15. The computer-implemented method of claim 14, wherein:
the one type instrumentation comprises a relatively high level of instrumentation in which relatively many aspects of the performance of the component are tracked, and the another type of instrumentation comprises a relatively low level of instrumentation in which relatively few aspects of the performance of the component are tracked.

16. The computer-implemented method of claim 12, further comprising:
determining when the component is no longer of interest; and
responsive to the determining that the component is no longer of interest: at agent software associated with the application, updating the list to indicate that the component is no longer of interest and reincorporating the component into the application without instrumentation.

17. A computer program product, comprising:
a computer-readable storage device having computer-readable program code embodied thereon, the computer-readable program code comprising:
computer-readable program code configured to provide rules, the rules comprise a directive to add instrumentation to specified components of an application;
computer-readable program code configured to provide an interestingness engine which is dynamically updated based on performance data of the application;
computer-readable program code configured to provide a class loader; and
computer-readable program code configured to provide a probe builder, the class loader loads a component, which is among the specified components for which the rules comprise the directive to add instrumentation, to the probe builder, and the probe builder, in response to the class loader, consults the interestingness engine to determine whether the component is of interest before the probe builder decides whether to add instrumentation to the component.

18. The computer program product of claim 17, wherein:
the probe builder, to consult the interestingness engine, provides a query to the interestingness engine, and the interestingness engine determines that the component is among a list of components of interest and provides a report back to the probe builder with an indication to add instrumentation to the component.

19. The computer program product of claim 17, wherein:
the probe builder, to consult the interestingness engine, provides a query to the interestingness engine, and the interestingness engine determines that the component is not among a list of components of interest and provides a report back to the probe builder with an indication to not add instrumentation to the component, instead of following the directive to add instrumentation.

20. The computer program product of claim 17, wherein:
the computer-readable program code comprises computer-readable program code configured to provide a heuristics component which obtains the performance data from the application, the interestingness engine is responsive to the heuristics component.

21. The computer program product of claim 17, wherein:
the rules initially comprise a static list of classes of the application.

22. The computer program product of claim 17, wherein:
the component is among the specified components when the component is in a subclass of a specified class.

23. The computer program product of claim 17, wherein:
the component is among the specified components when the component implements a specified interface.

24. The computer program product of claim 17, wherein:
the component is initially of interest and the probe builder adds instrumentation to the component; and
the interestingness engine receives additional performance data which indicates the component is no longer of interest, and, in response, initiates a redefinition of the component which does not include instrumentation.

* * * * *